(12) United States Patent
Nishiura

(10) Patent No.: US 11,827,796 B2
(45) Date of Patent: Nov. 28, 2023

(54) CURABLE RESIN COMPOSITION FOR THREE-DIMENSIONAL SHAPING AND METHOD OF MANUFACTURING THREE-DIMENSIONALLY SHAPED PRODUCT

(71) Applicant: CANON KABUSHIKI KAISHA, Tokyo (JP)

(72) Inventor: Chiaki Nishiura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 706 days.

(21) Appl. No.: 16/378,779

(22) Filed: Apr. 9, 2019

(65) Prior Publication Data

US 2019/0315981 A1    Oct. 17, 2019

(30) Foreign Application Priority Data

Apr. 16, 2018 (JP) ................................. 2018-078098
Mar. 12, 2019 (JP) ................................. 2019-044363

(51) Int. Cl.
| | |
|---|---|
| *C09D 11/107* | (2014.01) |
| *C09D 11/101* | (2014.01) |
| *B29C 64/124* | (2017.01) |
| *B33Y 70/00* | (2020.01) |
| *B33Y 10/00* | (2015.01) |

(52) U.S. Cl.
CPC .......... *C09D 11/107* (2013.01); *B29C 64/124* (2017.08); *B33Y 10/00* (2014.12); *B33Y 70/00* (2014.12); *C09D 11/101* (2013.01)

(58) Field of Classification Search
CPC ..... C09D 11/107; C09D 11/101; B33Y 10/00; B33Y 70/22; B29C 64/124
See application file for complete search history.

(56) References Cited

U.S. PATENT DOCUMENTS

| | | | | |
|---|---|---|---|---|
| 2008/0038472 | A1* | 2/2008 | Suzuki ..................... | B05D 1/36 427/384 |
| 2015/0239022 | A1* | 8/2015 | Kobayashi .............. | B08B 17/06 264/1.36 |
| 2015/0344709 | A1* | 12/2015 | Araki ...................... | C09D 11/40 522/167 |
| 2016/0370507 | A1* | 12/2016 | Hisamitsu ............... | G02B 1/14 |

FOREIGN PATENT DOCUMENTS

| | | | | |
|---|---|---|---|---|
| EP | 2813372 | A2 * | 12/2014 | ....... B29C 45/14688 |
| EP | 2853367 | A2 * | 4/2015 | ......... B29C 37/0032 |
| EP | 2949710 | A1 * | 12/2015 | ......... B29C 37/0032 |
| JP | 2007-2144 | A | 1/2007 | |
| JP | 2011-16871 | A | 1/2011 | |
| JP | 2011-225779 | A | 11/2011 | |
| JP | 2012226040 | A * | 11/2012 | |
| WO | WO-2016104770 | A1 * | 6/2016 | ............. B32B 27/00 |
| WO | 2016/171024 | A1 | 10/2016 | |

OTHER PUBLICATIONS

Machine English translation of JP-2012226040-A (Year: 2012).*
Machine English translation of WO-2016104770-A1 (Year: 2016).*

* cited by examiner

*Primary Examiner* — Jessica M Roswell
(74) *Attorney, Agent, or Firm* — VENABLE LLP

(57) ABSTRACT

Provided is a curable resin composition including (A) a (meth)acrylic compound having a number-average molecular weight of 5,000 or less and represented by the formula (1) ($R_1$ is a hydrogen atom, etc., $L_1$ and $L_2$ each represent an alkylene group, etc., $L_3$ represents a divalent linking group having an ether structure, etc. and $Q_1$ to $Q_3$ each represent a divalent linking group —O—, etc.), (B) a (meth)acrylic organosiloxane compound having a number-average molecular weight of 1,000 or less and represented by the following formula (2) ($R_3$ represents a hydrogen atom, etc., $R_4$ represents an alkyl group, etc., $L_4$ represents a single bond, etc., $Q_4$ represents a single bond, etc., and m stands for an average number of repeating constituting units) and (C) a curing agent. A (meth)acrylic compound (A):(meth)acrylic organosiloxane compound (B) mass ratio is 40:60 to 85:15.

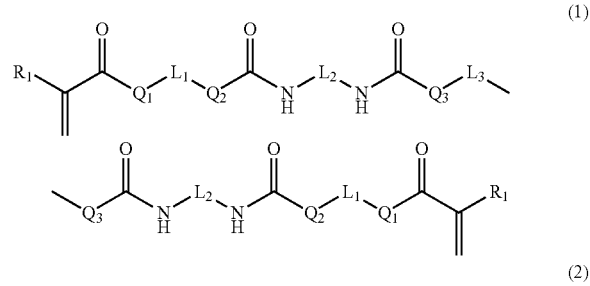

20 Claims, No Drawings

CURABLE RESIN COMPOSITION FOR THREE-DIMENSIONAL SHAPING AND METHOD OF MANUFACTURING THREE-DIMENSIONALLY SHAPED PRODUCT

BACKGROUND OF THE INVENTION

Field of the Invention

The present invention relates to a curable resin composition and a method of manufacturing a three-dimensionally shaped product by using the composition.

Description of the Related Art

As one example of the use of a liquid curable resin composition, an optical three-dimensional shaping method (optical shaping method) has been intensively studied in which a desired three-dimensionally shaped product is manufactured by curing the curable resin composition into layers by exposure to light such as ultraviolet light and stacking them one after another. The use of the optical shaping method is not limited to shaping of a prototype for confirming the shape (rapid prototyping) but it has extended to shaping of a working model for verifying its functionality or shaping of a mold (rapid tooling). The use of the optical shaping method has extended even to shaping of actual products (rapid manufacturing).

In such a background, there has been a higher demand for curable resin compositions. Recently, curable resin compositions capable of being shaped into a three-dimensional product having sliding properties and mechanical properties (such as strength, rigidity and toughness) as high as those of all-purpose engineering plastics have been demanded. As a method of providing a cured product having a reduced friction coefficient and improved releasability and sliding properties, a decrease in surface free energy, addition of a solid lubricant or incorporation of a liquid lubricant such as oil is generally well-known. The mechanical physical properties of the cured product such as heat stability and toughness largely depend on the chemical structure of a compound contained in the resin composition. For example, it is generally well known that a composition having a rigid structure can have excellent heat resistance after curing, while a composition having a flexible structure has excellent toughness after curing. A number of investigations have so far been carried out.

Japanese Patent Application Laid-Open No. 2007-2144 describes a resin composition using urethane acrylate and an acrylic compound having a polycyclic substituent and it discloses that highly durable protective coating with less warpage after curing can be provided. Japanese Patent Application Laid-Open No. 2011-225779 describes a resin composition using an acrylic compound and an acryloyl-containing polydimethylsiloxane and it discloses that a light sealing material excellent in transparency and heat resistance can be provided. Japanese Patent Application Laid-Open No. 2011-16871 describes a resin composition using an acrylic resin polymer and an acryloyl-containing polydimethylsiloxane and it discloses that a top coat layer excellent in abrasion resistance and adhesion can be provided. International Publication No. WO2016/171024 describes a resin composition using a compound having two or more (meth)acryloyl groups and a silicon-modified poly(meth)acrylate compound and it discloses that a hard coat layer having high surface hardness and scratch resistance while suppressing curling properties can be provided.

SUMMARY OF THE INVENTION

A curable resin composition for three-dimensional shaping according to the invention contains:

(A) a (meth)acrylic compound having a number-average molecular weight of 5,000 or less and represented by the following formula (1):

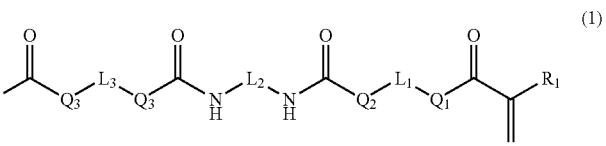

(in the formula (1), $R_1$ represents a hydrogen atom or a methyl group;

$L_1$ and $L_2$ each represent a substituted or unsubstituted, linear or cyclic alkylene group having from 1 to 20 carbon atoms or a substituted or unsubstituted arylene group having from 1 to 20 carbon atoms and the carbon atom(s) constituting the alkylene group or arylene group may be substituted with an oxygen atom, a sulfur atom, a nitrogen atom or a silicon atom;

$L_3$ is a linear or cyclic divalent linking group containing an ether structure, an ester structure or a carbonate structure; and $Q_1$, $Q_2$ and $Q_3$ each represent a divalent linking group —O— or —$NR_2$— ($R_2$ represents a hydrogen atom or a substituted or unsubstituted linear or cyclic alkyl group having from 1 to 10 carbon atoms);

(B) a (meth)acrylic organosiloxane compound having a number-average molecular weight of 1,000 or less and represented by the following formula (2):

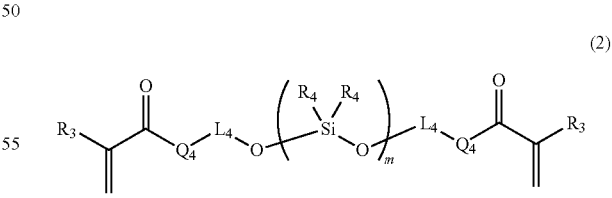

(in the formula (2), $R_3$ represents a hydrogen atom or a methyl group;

$R_4$s each represent an alkyl group having from 1 to 6 carbon atoms or a phenyl group and respective $R_4$s in different repeating constituting units may be different from each other;

$L_4$ represents a single bond or a substituted or unsubstituted, linear or cyclic alkylene group having from 1 to 10 carbon atoms and the carbon atom(s) constituting the alkylene group may be substituted with an oxygen atom, a sulfur atom, a nitrogen atom or a silicon atom;

$Q_4$ represents a single bond or a divalent linking group —O—; and m represents an average of the number of the repeating constituting units and is a value at which the (meth)acrylic organosiloxane compound has a number-average molecular weight of 1,000 or less); and (C) a curing agent, wherein supposing that a total mass of the (meth)acrylic compound (A) and the (meth)acrylic organosiloxane compound (B) is 100, a (meth)acrylic compound (A):(meth) acrylic organosiloxane compound (B) mass ratio is from 40:60 to 85:15.

Further features of the present invention will become apparent from the following description of exemplary embodiments.

DESCRIPTION OF THE EMBODIMENTS

When a curable resin composition is used for optical shaping, a cured product of it is required to have high heat resistance, toughness and sliding properties. Further, the curable resin composition before curing preferably has a low viscosity from the standpoint of shaping accuracy. It is however difficult to satisfy all of these physical properties. The resin composition described in Japanese Patent Application Laid-Open No. 2007-2144 does not have sufficiently good sliding properties because it does not contain a component for improving sliding properties. The resin composition described in Japanese Patent Application Laid-Open No. 2011-225779 cannot have sufficiently good toughness after curing. The resin composition described in Japanese Patent Application Laid-Open No. 2011-16871 has a high viscosity and is therefore unsuited as a resin composition for optical shaping method because it contains an acrylic polymer. The resin composition described in International Publication No. WO2016/171024 has a high acrylic value so that a cured product of it does not have sufficiently high toughness.

With a view to overcoming the above-described problems, an object of the invention is therefore to provide a curable resin composition for optical shaping having a low viscosity and excellent shaping accuracy and after being cured, having high toughness, heat resistance and sliding properties.

Embodiments of the invention will hereinafter be described. The embodiments described herein are shown as exemplary of the embodiments of the invention and the invention is not limited to or by these embodiments.

<(Meth)Acrylic Compound (A) (Component (A))>

The (meth)acrylic compound (A) to be used in the invention has a number-average molecular weight of 5,000 or less and is represented by the following formula (1):

ene, butylene, pentylene, hexylene, heptylene, octylene, nonylene and decylene, alicyclic alkylene groups such as cyclopropanediyl, cyclobutanediyl, cyclopentanediyl, cyclohexanediyl, cycloheptanediyl and cyclooctanediyl; and arylene groups such as phenylene, tolylene, biphenylene, naphthalenediyl, anthracenediyl, phenanthrenediyl, fluorenediyl, diphenylmethanediyl, diphenylethanediyl and diphenylpropanediyl.

The carbon atoms constituting the alkylene group or arylene group may be substituted with an oxygen atom, a sulfur atom, a nitrogen atom or a silicon atom and in this case, the number of the unsubstituted carbon atoms is preferably from 1 to 20. Examples include a dimethyl etherdiyl group, a diethyl etherdiyl group, a dimethyl sulfonediyl group, a diethyl sulfonediyl group, a dimethyl aminodiyl group, a diethyl aminodiyl group and a pyridinediyl group.

These groups may be unsubstituted or may have a substituent other than a (meth)acryloyl group. The substituent which these groups may have has a linear or branched structure. Examples include linear alkyl groups such as methyl, ethyl, propyl, butyl, pentyl, hexyl, heptyl, octyl, nonyl and decyl, cyclic alkyl groups such as cyclopropyl, cyclobutyl, cyclopentyl, cyclohexyl, cycloheptyl and cyclooctyl, aromatic hydrocarbon groups such as phenyl, tolyl, naphthyl, anthranyl and phenanthryl, and alkoxy groups such as methoxy, ethoxy, propoxy, butoxy and phenoxy.

$L_1$ is preferably a methylene group, an ethylene group, a propylene group or a butylene group. The curable resin composition of the invention containing a (meth)acrylic compound (A) having such a substituent can keep its low viscosity at a low level and further, a cured product obtained from the curable resin composition of the invention can have enhanced heat resistance.

$L_2$ is preferably a diphenylmethanediyl group, a hexylene group, a phenylene group, a tolylene group or an isophoronylene group from the standpoint of easy availability. A cured product obtained from the curable resin composition of the invention containing a hexylene or isophoronylene group can have enhanced toughness. A cured product obtained from the curable resin composition containing a diphenylmethanediyl, phenylene or tolylene group can have enhanced heat resistance.

$L_3$ represents a linear or cyclic divalent linking group containing an ether structure, an ester structure or a carbonate structure. $L_3$ preferably has, as a constituting unit thereof, an alkylene unit such as methylene, a cycloalkylene unit such as cyclohexylene or an arylene unit such as phenylene. When $L_3$ contains an ether structure, molecular rotation is not inhibited so that a cured product obtained from such a

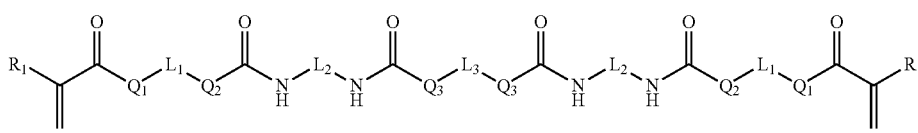

(1)

In the formula (1), $R_1$ represents a hydrogen atom or a methyl group, preferably a hydrogen atom.

$L_1$ and $L_2$ each represent a substituted or unsubstituted, linear or cyclic alkylene group having from 1 to 20 carbon atoms or a substituted or unsubstituted arylene group having from 1 to 20 carbon atoms. Examples of $L_1$ or $L_2$ include linear alkylene groups such as methylene, ethylene, propyl-curable resin composition of the invention has excellent toughness and is therefore preferred. When it contains an ester structure or a carbonate structure, molecular rotation is suppressed to some extent so that a cured product obtained from such a curable resin composition of the invention is excellent in balance between heat resistance and toughness and is therefore preferred.

$Q_1$, $Q_2$ and $Q_3$ each represent a divalent linking group —O— or —$NR_2$— and $R_2$ represents a hydrogen atom or a linear or cyclic alkyl group having from 1 to 10 carbon atoms which may have a substituent other than a (meth)acryloyl group. Examples of the alkyl group include linear alkyl groups such as methyl, ethyl, propyl, butyl, t-butyl, pentyl, hexyl, heptyl, octyl, nonyl and decyl and cyclic alkyl groups such as cyclopropyl, cyclobutyl, cyclopentyl, cyclohexyl, cycloheptyl and cyclooctyl. $R_2$ is preferably a hydrogen atom from the standpoint of reactivity. $Q_1$, to $Q_3$ each preferably represent —O— because raw materials therefor are easy available and can be selected from a variety of raw materials.

The (meth)acrylic compound (A) of the invention has a number-average molecular weight of 5,000 or less. More preferably, the number-average molecular weight is 1000 or more to 3200 or less. The (meth)acrylic compound (A) having a number-average molecular weight more than the above-described range tends to have reduced heat resistance due to a reduction in the concentration of a (meth)acryloyl group. The number-average molecular weight falling within the above-described range is preferred because the concentration of a (meth)acryloyl group becomes such that it satisfies both toughness and heat resistance of the cured product. Further, it is preferred because such a curable resin composition has a viscosity suppressed to a low level.

As the (meth)acrylic compound (A), commercially available products, for example, UX-3204, UX-4101, UX-6100, UX-6101, UX-8101, UX-0937, UXF-4001-M35 and UXF-4002 (each, product of Nippon Kayaku), V-4221 (product of DIC), U-2PPA, U-200PA, UA-160TM, UA-290TM, UA-4200, UA-4400 and UA-122P (each, product of Shin-Nakamura Chemical), Hitaloid 4861, Tesrack 2300, Hitaloid 4863, Tesrack 2311 and Tesrack 2304 (each, product of Hitachi Chemical), AH-600 and UF-8001G (each, product of Kyoeisha Chemical), and UN-333, UN-2600, UN-2700 and UN-9000PEP (each, product of Negami Chemical Industrial) can be used preferably.

As the specific example of the (meth)acrylic compound (A), (meth)acrylic compounds represented by the following structures are preferred from the standpoint of satisfying both toughness and heat resistance.

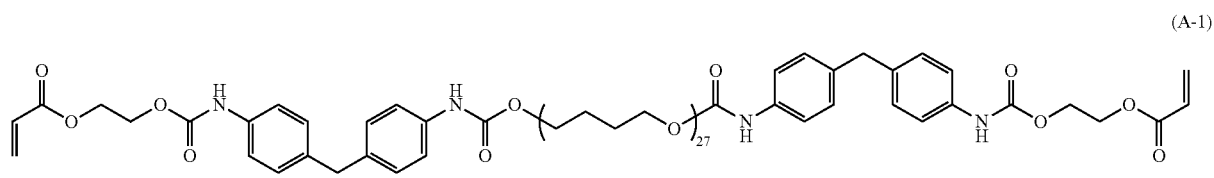

(A-1)

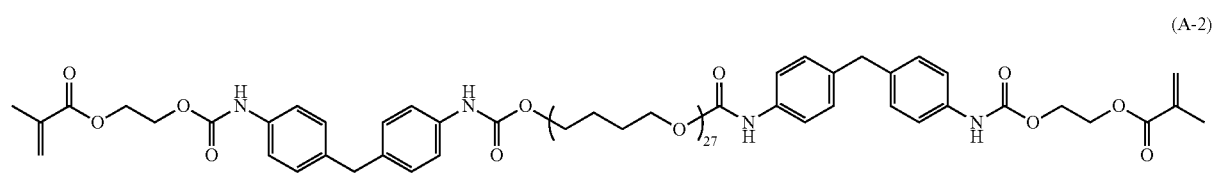

(A-2)

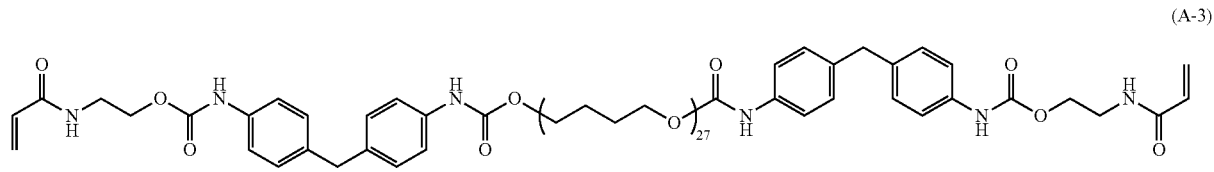

(A-3)

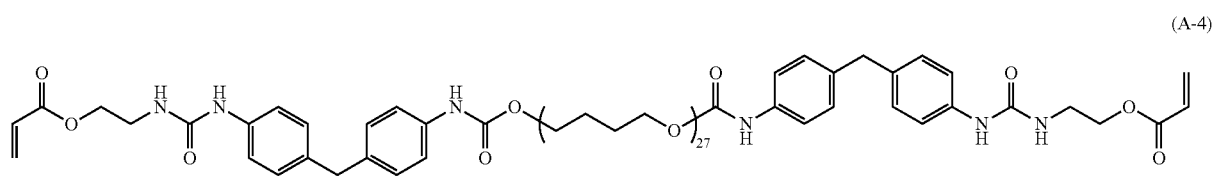

(A-4)

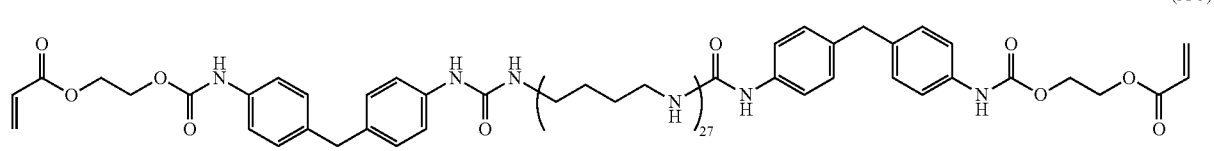

(A-5)

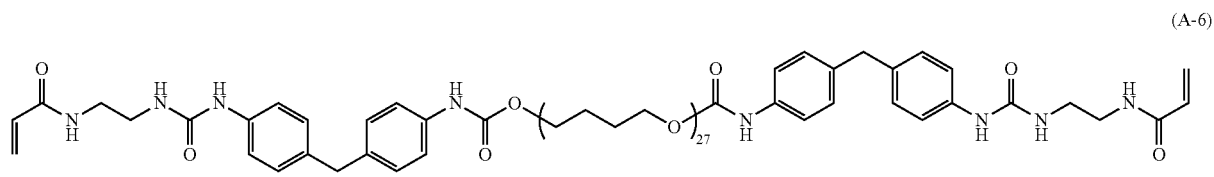

(A-6)

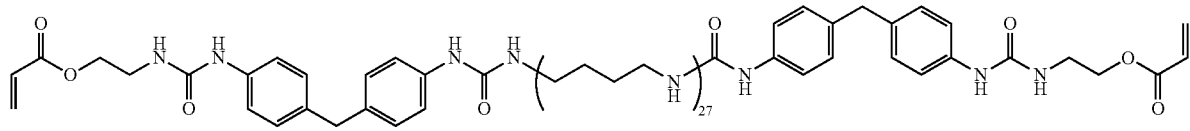
(A-7)
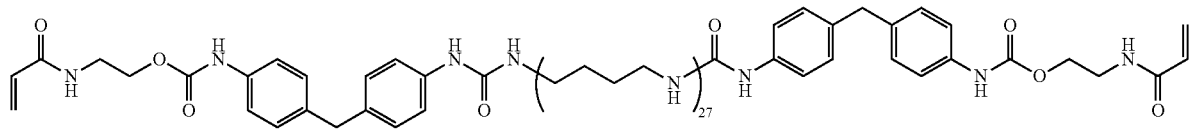
(A-8)
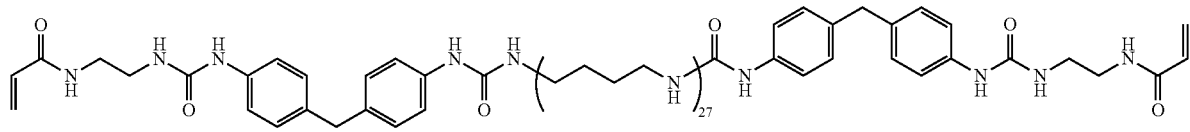
(A-9)
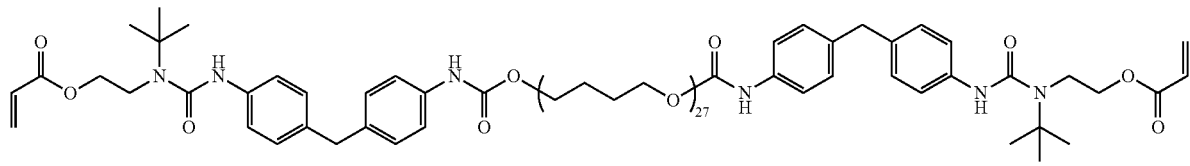
(A-10)
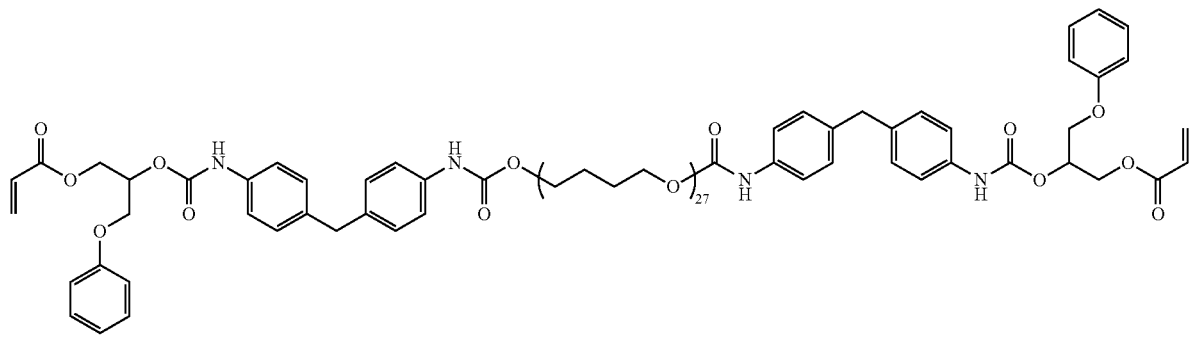
(A-11)
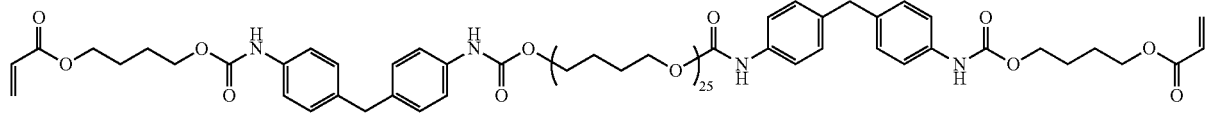
(A-12)
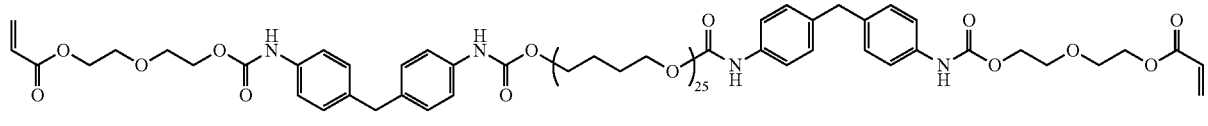
(A-13)
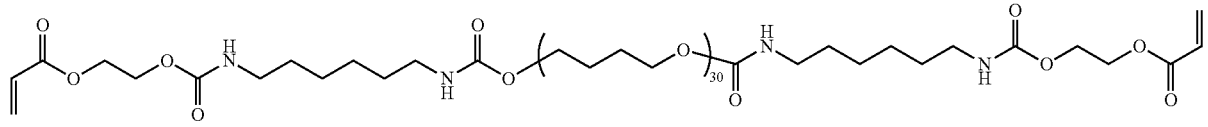
(A-14)

-continued
(A-15)
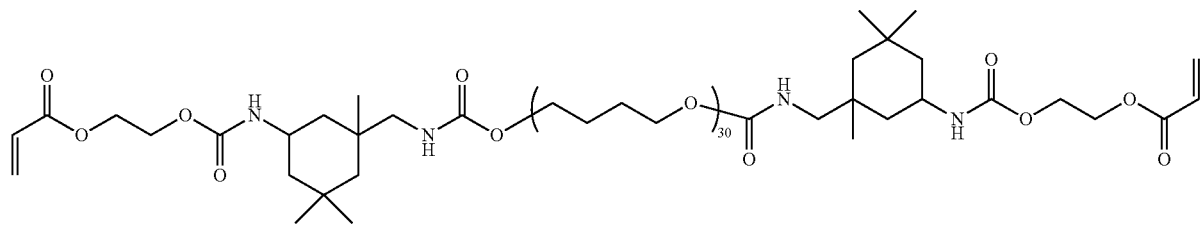
(A-16)
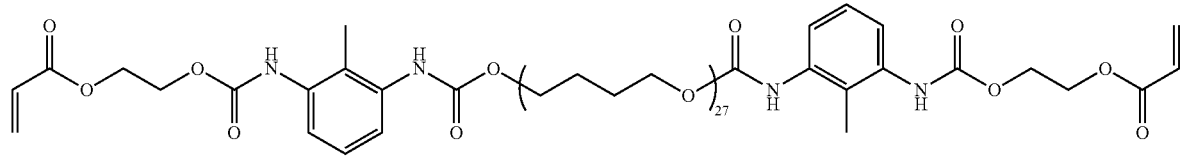
(A-17)
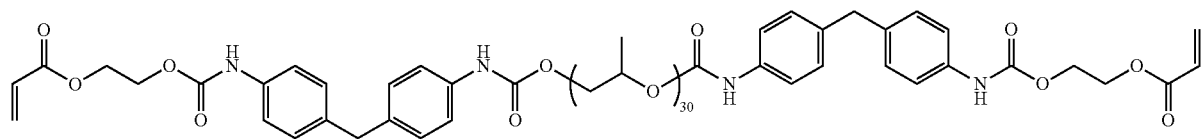
(A-18)
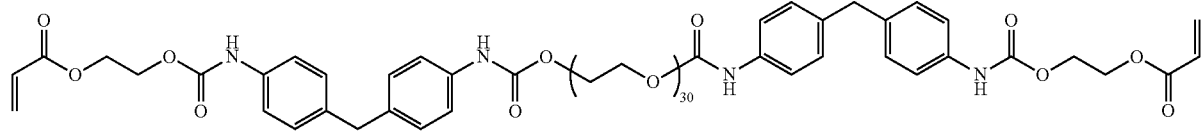
(A-19)
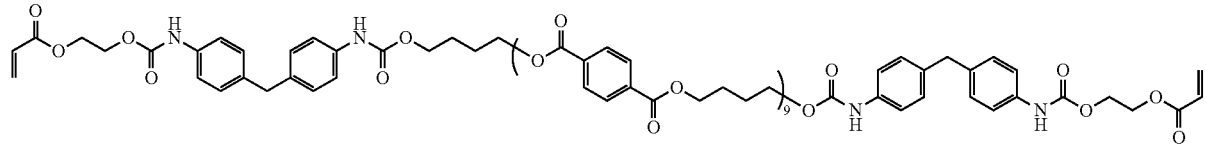
(A-20)
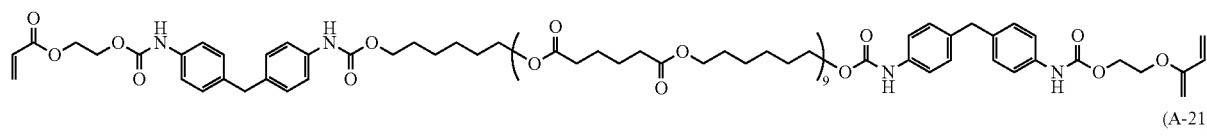
(A-21)
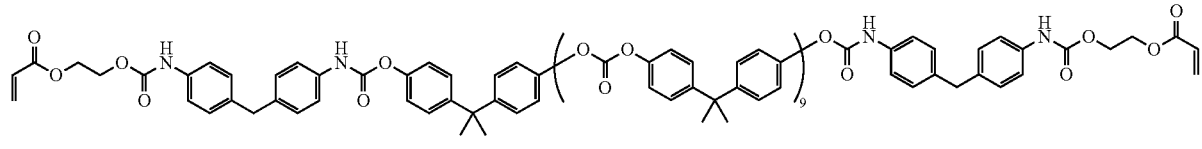
(A-22)
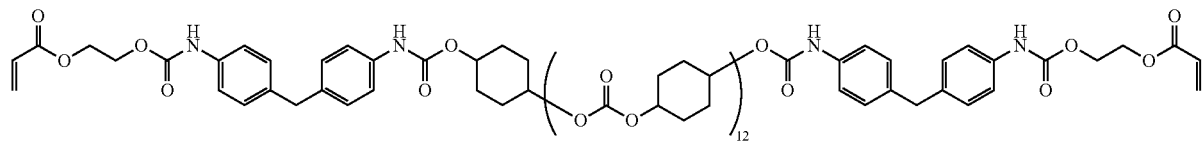
(A-23)
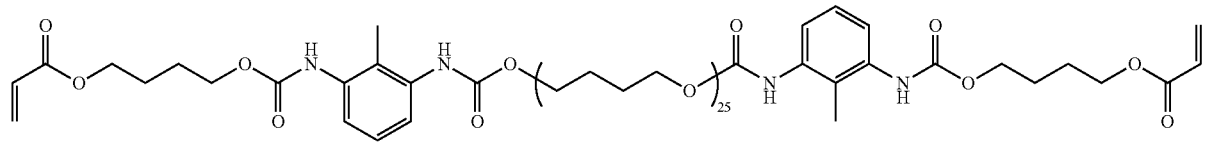

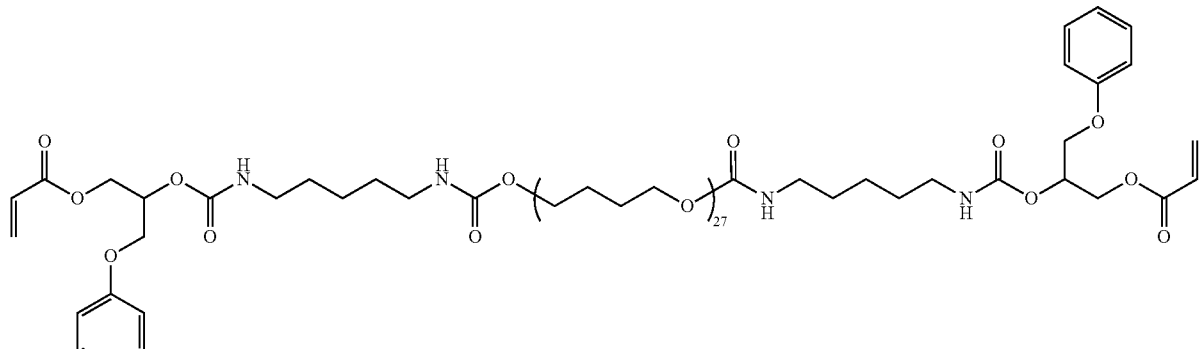

(A-24)

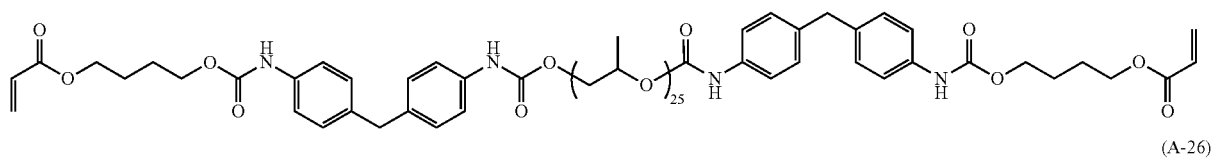

(A-25)

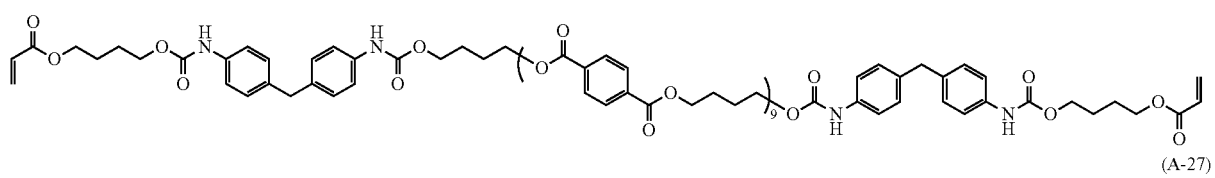

(A-26)

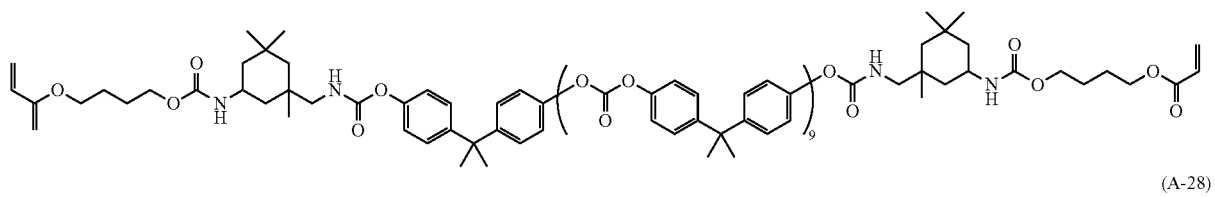

(A-27)

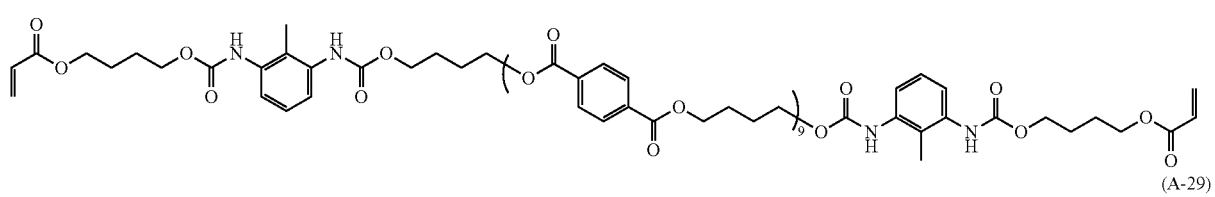

(A-28)

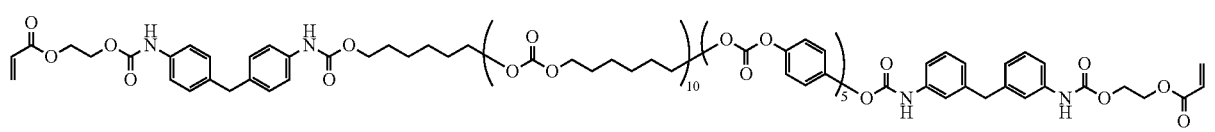

(A-29)

Supposing that a total mass of the component (A) and the component (B) is 100, a component (A):component (B) mass ratio ((A):(B)) is from 40:60 to 85:15, preferably from 66:34 to 85:15 from the standpoint of providing a cured product having improved toughness, heat resistance and sliding properties. In other words, a content of the (meth)acrylic compound (A) is 40 parts by mass or more to 85 parts by mass or less, preferably 66 parts by mass or more to 85 parts by mass or less based on 100 parts by mass of the total amount of the (meth)acrylic compound (A) and the (meth)acrylic organosiloxane compound (B).

((Process for Preparing (Meth)Acrylic Compound (A))

A process for preparing the (meth)acrylic compound (A) is not particularly limited. For example, the (meth)acrylic compound (A) of the invention can be obtained by reacting a diol compound (A—i) or a diamino compound (A—ii) with an excess amount of a diisocyanate compound (A—iii) to obtain a diisocyanate compound (A—iv) having at both ends thereof an isocyanate group and then, reacting the diisocyanate compound (A—iv) having at both ends thereof an isocyanate group with a hydroxyl-containing (meth)acrylic compound (A—v) or an amino-containing (meth)acrylic compound (A—vi).

Examples of the diol compound (A—i) include compounds represented by the following formula (3). In the formula (3), $L_3$ corresponds to $L_3$ of the formula (1) and details of it are as described above in the formula (1). These diol compounds (A—i) may be used singly or two or more of them may be used in combination.

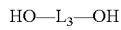  (3)

Examples of the diamino compound (A—ii) include compounds represented by the following formula (4). In the formula (4), $L_3$ and $R_2$ correspond to $L_3$ and $R_2$ of the formula (1), respectively and details of them are as described above in the formula (1). The diamino compounds (A—ii) may be used singly or two or more of them may be used in combination.

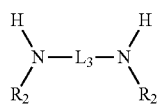  (4)

Examples of the diisocyanate compound (A13 iii) include, but not limited to, aliphatic diisocyanates such as trimethylene diisocyanate, 1,2-propylene diisocyanate, butylene diisocyanate, hexamethylene diisocyanate, pentamethylene diisocyanate and trimethylhexamethylene diisocyanate, alicyclic diisocyanates such as cyclohexane diisocyanate, methylcyclohexane diisocyanate, 3-isocyanatomethyl-3,5,5-trimethylcyclohexyl isocyanate (isophorodiisocyanate), methylenebis(cyclohexylisocyanate) or dicyclohexylmethane diisocyanate, bis(isocyanatomethyl)cyclohexane and norbornane diisocyanate and aromatic diisocyanates such as phenylene diisocyanate, tolylene diisocyanate, 4,4'-diphenyl diisocyanate, 1,5-naphthalene diisocyanate, diphenylmethane diisocyanate and 4,4'-toluidine diisocyanate. These diisocyanate compounds exemplified above as (A—iii) may be used singly or two or more of them may be used in combination.

Examples of the hydroxyl-containing (meth)acrylic compound (A—v) include, but not limited to, hydroxymethyl acrylate, 2-hydroxyethyl acrylate, 2-hydroxypropyl acrylate, 3-hydroxypropyl acrylate, 4-hydroxybutyl acrylate, N-(hydroxymethyl)acrylamide, N-(2-hydroxyethyl)acrylamide, N-(2-hydroxypropyl)acrylamide, N-(3-hydroxypropyl)acrylamide, N-(4-hydroxybutyl)acrylamide, hydroxymethyl methacrylate, 2-hydroxyethyl methacrylate, 2-hydroxypropyl methacrylate, 3-hydroxypropyl methacrylate, 4-hydroxybutyl methacrylate, N-(hydroxymethyl) methacrylamide, N-(2-hydroxyethyl) methacrylamide, N-(2-hydroxypropyl) methacrylamide, N-(3-hydroxypropyl) methacrylamide and N-(4-hydroxybutyl) methacrylamide. The hydroxyl-containing (meth)acrylic compounds (A—v) may be used singly or two or more of them may be used in combination.

Examples of the amino-containing (meth)acrylic compound (A—vi) include, but not limited to, aminomethyl acrylate, 2-aminoethyl acrylate, 2-aminopropyl acrylate, 3-aminopropyl acrylate, 4-aminobutyl acrylate, N-(aminomethyl) acrylamide, N-(2-aminoethyl) acrylamide, N-(2-aminopropyl) acrylamide, N-(3-aminopropyl) acrylamide, N-(4-aminobutyl) acrylamide, aminomethyl methacrylate, 2-aminoethyl methacrylate, 2-aminopropyl methacrylate, 3-aminopropyl methacrylate, 4-aminobutyl methacrylate, N-(aminomethyl) methacrylamide, N-(2-aminoethyl) methacrylamide, N-(2-aminopropyl) methacrylamide, N-(3-aminopropyl) methacrylamide and N-(4-aminobutyl) methacrylamide. These amino-containing (meth)acrylic compounds (A-vi) may be used singly or two or more of them may be used in combination.

As another preparation process, the (meth)acrylic compound (A) of the invention can be prepared by reacting the hydroxyl-containing (meth)acrylic compound (A—v) or the amino-containing (meth)acrylic compound (A—vi) with an excess amount of the diisocyanate compound (A—iii) to obtain a (meth)acrylic compound (A—vii) having at both ends thereof an isocyanate group and then, reacting the (meth)acrylic compound (A—vii) having at both ends thereof an isocyanate group with the diol compound (A—i) or the diamino compound (A—ii).

<(Meth)acrylic organosiloxane compound (B) (Component (B))>

The (meth)acrylic organosiloxane compound (B) to be used in the invention has a number-average molecular weight of 1,000 or less and is represented by the following formula (2).

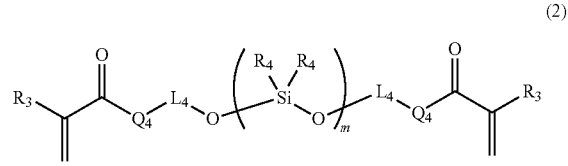  (2)

In the formula (2), $R_3$ represents a hydrogen atom or a methyl group.

$R_4$s each represent an alkyl group having from 1 to 6 carbon atoms or a phenyl group and the respective $R_4$s in different repeating constituting units may be different from each other. Examples of the alkyl group as $R_4$ include methyl, ethyl, propyl, butyl, pentyl and hexyl. When $R_4$ represents a methyl group, a cured product obtained from such a curable resin composition of the invention can keep a low friction coefficient and is therefore preferred. When it represents a phenyl group, a cured product obtained from such a curable resin composition of the invention can have enhanced heat resistance and is therefore preferred.

$L_4$ represents a single bond or a linear or cyclic alkylene group having from 1 to 20 carbon atoms which may have a substituent other than a (meth)acryloyl group. The carbon atoms constituting the alkylene group may be substituted with an oxygen atom, a sulfur atom, a nitrogen atom or a silicon atom. In this case, the number of unsubstituted carbon atoms is preferably from 1 to 20.

Examples of $L_4$ include alkylene groups similar to those exemplified above as $L_1$ or $L_2$ in the formula (1). $L_4$ is preferably a single bond, a methylene group, an ethylene group, a propylene group or a butylene group. The curable resin composition having such a group can keep a low viscosity and further, a cured product obtained from such a curable resin composition of the invention has enhanced heat resistance.

$Q_4$ represents a single bond or a divalent linking group —O—. $Q_4$ is preferably —O— because raw materials therefor are easily available and can be selected from a variety of raw materials.

In the above formula, m represents an average of the number of the repeating constituting units and is a value at which the number-average molecular weight of the (meth)acrylic organosiloxane compound becomes 1,000 or less. It is important to keep the (meth)acryloyl concentration of the whole curable resin composition at not a too low and not a too high value in order to satisfy both toughness and heat resistance which are important physical properties of a cured product for three-dimensional shaping. Since the (meth)

acrylic organosiloxane compound (B) of the invention has 2 (meth)acryloyl groups, determination of the number-average molecular weight based on the value of m of the repeating constituting units results in univocal determination of the concentration of the (meth)acryloyl groups. It is preferred to select a value of m at which the (meth)acrylic organosiloxane compound (B) has a number-average molecular weight of 1,000 or less and it is more preferred to select a value of m at which the number-average molecular weight is 200 or more to 500 or less. Selecting such a value as m is preferred because the concentration of a (meth) acryloyl group at which the cured product thus obtained has both toughness and heat resistance can be realized and further, the curable resin composition can have a viscosity suppressed to a low level.

As the (meth)acrylic organosiloxane compound (B), commercially available products such as X-22-164 and X-22-164AS (each, product of Shin-Etsu Chemical) can be used preferably.

As specific examples of the (meth)acrylic organosiloxane compound (B), (meth)acrylic organosiloxane compounds represented by the following structure are preferred from the standpoint of satisfying both toughness and heat resistance.

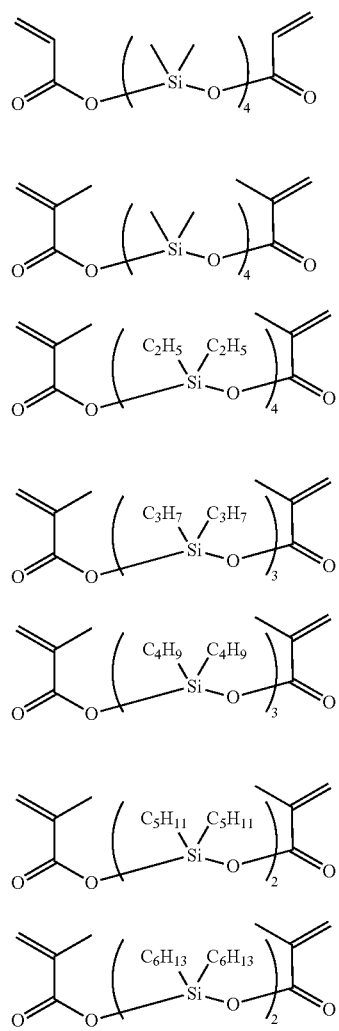

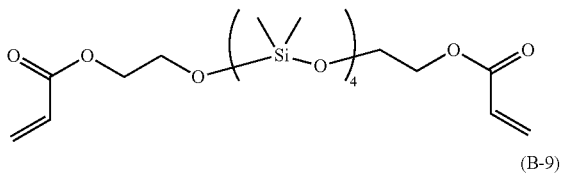

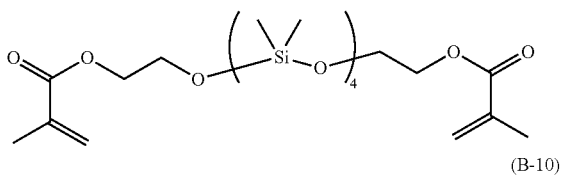

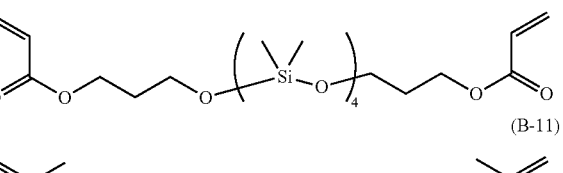

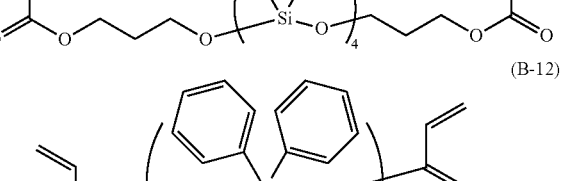

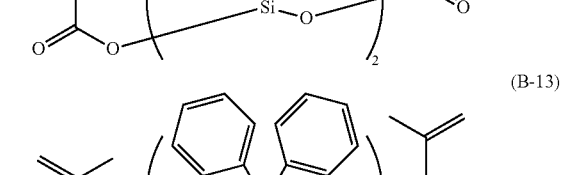

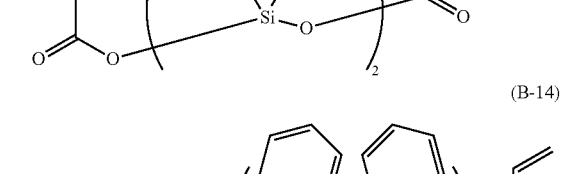

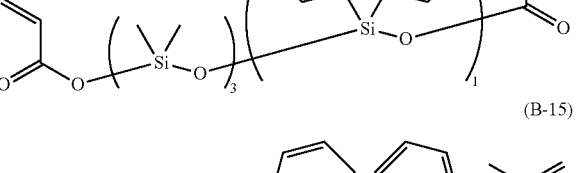

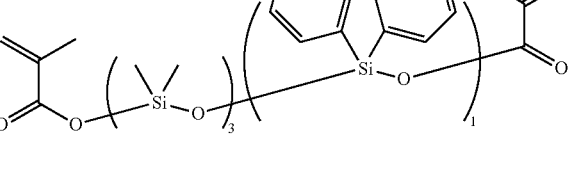

From the standpoint of providing a cured product having improved toughness, heat resistance and sliding properties, a component (A):component (B) mass ratio ((A):(B)) supposing that the total mass of the component (A) and the component (B) is 100 is from 40:60 to 85:15, preferably from 66:34 to 85:15. This means that a content of the (meth)acrylic organosiloxane compound (B) is 15 parts by mass or more to 60 parts by mass or less, preferably 15 parts by mass or more to 34 parts by mass or less based on 100 parts by mass of the total amount of the (meth)acrylic compound (A) and the (meth)acrylic organosiloxane compound (B).

(Process for Preparing (Meth)Acrylic Organosiloxane Compound (B))

A process for preparing the (meth)acrylic organosiloxane compound (B) is not particularly limited. For example, the (meth)acrylic organosiloxane compound (B) can be obtained by reacting an organosiloxane-diol compound (B—i) with (meth)acryloyl chloride.

Examples of the organosiloxane-diol compound (B—i) include compounds represented by the following formula (5). In the formula (5), $Q_4$, $L_4$, $R_4$, and m correspond to $Q_4$, $L_4$, $R_4$ and m in the formula (2), respectively and details of them are as described above in the formula (2).

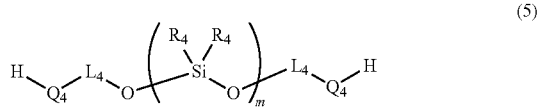

(5)

As another preparation process, the (meth)acrylic organosiloxane compound (B) can be obtained by reacting the organosiloxane-diol compound (B—i) and (meth)acrylic acid in the presence of a condensation agent such as carbodiimide.

<Curing agent (C) (Component (C))>

As the curing agent (C), a photopolymerization initiator is preferably used and a photoradical polymerization initiator is more preferably used. Without impairing the advantage of the invention, they may be used either singly or in combination. In addition to the photopolymerization initiator, another curing agent such as thermal radical polymerization initiator, cationic polymerization initiator, anionic polymerization initiator or thermal latent curing agent may be added.

[Photoradical Polymerization Initiator]

A photoradical polymerization initiator can be mainly classified into an intramolecular cleavage type and a hydrogen abstraction type. When the intramolecular cleavage type is used, due to absorption of a light having a specific wavelength, a bond at a specific site is cleaved and radicals generated at the cleaved site serve as a polymerization initiator to start polymerization between the (meth)acrylic compound (A) and the (meth)acrylic organosiloxane compound (B). When the hydrogen abstraction type is used, species excited by absorbing a light having a specific wavelength cause a hydrogen abstraction reaction from hydrogen donors present therearound and radicals thus generated serve as a polymerization initiator to start polymerization between the (meth)acrylic compound (A) and the (meth)acrylic organosiloxane compound (B).

As the intramolecular cleavage type photoradical polymerization initiator, known are an alkylphenone-based photoradical polymerization initiator, an acylphosphine oxide-based photoradical polymerization initiator and an oxime ester-based photoradical polymerization initiator. They generate radical species after α-cleavage of a bond adjacent to a carbonyl group. Examples of the alkylphenone-based photoradical polymerization initiator include benzylmethylketal-based photoradical polymerization initiators, α-hydroxyalkylphenone-based photoradical polymerization initiators and aminoalkylphenone-based photoradical polymerization initiators. Specific examples of the benzylmethylketal-based photoradical polymerization initiators include 2,2'-dimethoxy-1,2-diphenylethan-1-one (Irgacure® 651, product of BASF), those of the α-hydroxyalkylphenone-based photoradical polymerization initiators include 2-hydroxy-2-methyl-1-phenylpropan-1-one (Darocur® 1173, product of BASF), 1-hydroxycyclohexylphenylketone (Irgacure® 184, product of BASF), 1-[4-(2-hydroxyethoxy)phenyl]-2-hydroxy-2-methyl-1-propan-1-one (Irgacure® 2959, product of BASF), 2-hydroxy-1-{4-[4-(2-hydroxy-2-methylpropionyl)benzyl]phenyl}-2-methypropan-1-one (Irgacure® 127, product of BASF); those of the aminoalkylphenone-based photoradical polymerization initiators include 2-methyl-1-(4-methylthiophenyl)-2-morpholinopropan-1-one (Irgacure® 907, product of BASF) and 2-benzyl-methyl-2-dimethylamino-1-(4-morpholinophenyl)-1-butanone (Irgacure® 369, product of BASF), but the specific examples are not limited to them. Examples of the acylphosphine oxide-based photoradical polymerization initiators include, but not limited to, 2,4,6-trimethylbenzoyldiphenylphosphine oxide (Lucirin® TPO, product of BASF) and bis(2,4,6-trimethylbenzoyl)phenylphosphine oxide (Irgacure® 819, product of BASF). Examples of the oxime ester-based photoradical polymerization initiators include, but not limited to, (2E)-2-(benzoyloxyimino)-1-[4-(phenylthio)phenyl]octan-1-one (Irgacure® OXE-01, product of BASF).

Examples of the hydrogen abstraction type photoradical polymerization initiator include, but not limited to, anthraquinone derivatives such as 2-ethyl-9,10-anthraquinone and 2-t-butyl-9,10-anthraquinone and thioxanthone derivatives such as isopropylthioxanthone and 2,4-diethylthioxanthone.

In the invention, two or more of the above-described photoradical polymerization initiators may be used in combination, but may also be used singly. A thermal radical polymerization initiator may be added to make the polymerization reaction proceed by carrying out heat treatment after shaping.

The addition amount of the photoradical polymerization initiator is preferably 0.1 part by mass or more to 15 parts by mass or less, more preferably 0.1 part by mass or more to 10 parts by mass or less, each based on 100 parts by mass of the total amount of all the radical polymerizable compounds in the curable resin composition. Amounts of the photoradical polymerization initiator smaller than the above-described range may tend to lead to insufficient polymerization. Amounts of the photoradical polymerization initiator larger than the above-described range may lead to uneven polymerization due to deterioration in light transmission properties.

[Thermal Radical Polymerization Initiator]

A thermal radical polymerization initiator is not particularly limited and a conventionally known compound can be used in so far as it generates radicals when heated. Examples of the preferred compound include azo-based compounds, peroxides and persulfates. Examples of the azo-based compounds include 2,2'-azobisisobutyronitrile, 2,2'-azobis(methyl isobutyrate), 2,2'-azobis-2,4-dimethylvaleronitrile and 1,1'-azobis(1-acetoxy-1-phenylethane). Examples of the peroxides include benzoyl peroxide, di-t-butylbenzoyl peroxide, t-butylperoxy pivalate and di(4-t-butylcyclohexyl) peroxy dicarbonate. Examples of the persulfates include ammonium persulfate, sodium persulfate and potassium persulfate.

The addition amount of the thermal radical polymerization initiator is preferably 0.1 part by mass or more to 15 parts by mass or less, more preferably 0.1 part by mass or more to 10 parts by mass or less, each based on 100 parts by mass of the total amount of all the radical polymerizable compounds in the curable resin composition. Addition of an excess amount of the thermal radical polymerization initiator may presumably hinder an increase in molecular weight and cause deterioration in physical properties.

[Cationic Polymerization Initiator]

As a cationic polymerizable compound to be added, as a reactive diluent (D) which will be described later, to the curable resin composition of the invention, a cationic polymerization monomer can be used. The cationic polymerization initiator is classified into a photoacid generator and a thermal acid generator.

(Photoacid Generator)

A photoacid generator is a photocationic polymerization initiator that generates an acid capable of initiating cationic polymerization when exposed to energy rays such as ultraviolet rays.

As the photocationic polymerization initiator, onium salts having, as a cation portion thereof, an aromatic sulfonium, an aromatic iodonium, an aromatic diazonium, an aromatic ammonium, thianthrenium, thioxanthonium or ($\eta^6$-isopropylbenzene)($\eta^5$-cyclopentadienyl)-Fe cation and, as an anion portion, $BF_4$—, $PF_6$—, $SbF_6$— or $[BX_4]$— (with the proviso that X is a phenyl group substituted with two or more fluorine atoms or a trifluoromethyl group) can be used either singly or in combination.

Examples of the usable aromatic sulfonium salt include bis[4-(diphenyl sulfonio)phenyl]sulfide bishexafluorophosphate, bis[4-(diphenylsulfonio)phenyl]sulfide bishexafluoroantimonate, bis[4-(diphenylsulfonio)phenyl]sulfide bistetrafluoroborate, bis[4-(diphenylsulfonio)phenyl]sulfide tetrakis(pentafluorophenyl)borate, diphenyl-4-(phenylthio)phenyl sulfonium hexafluorophosphate, diphenyl-4-(phenylthio)phenyl sulfonium hexafluoroantimonate, diphenyl-4-(phenylthio)phenyl sulfonium tetrafluoroborate, diphenyl-4-(phenylthio)phenyl sulfonium tetrakis(pentafluorophenyl)borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis[4-(di(4-(2-hydroxyethoxy))phenylsulfonio)phenyl]sulfide bishexafluorophosphate, bis[4-(di(4-(2-hydroxyethoxy))phenylsulfonio)phenyl]sulfide bishexafluoroantimonate, bis[4-(di(4-(2-hydroxyethoxy))phenylsulfonio)phenyl]sulfide bistetrafluoroborate and bis[4-(di(4-(2-hydroxyethoxy))phenylsulfonio)phenyl]sulfide tetrakis(pentafluorophenyl)borate.

Examples of the usable aromatic iodonium salt include diphenyliodonium hexafluorophosphate, diphenyliodonium hexafluoroantimonate, diphenyliodonium tetrafluoroborate, diphenyliodoniumtetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl)phenyliodonium tetrafluoroborate and 4-methylphenyl-4-(1-methylethyl)phenyliodonium tetrakis(pentafluorophenyl)borate.

Examples of the usable aromatic diazonium salt include phenyldiazonium hexafluorophosphate, phenyldiazonium hexafluoroantimonate, phenyldiazonium tetrafluoroborate and phenyldiazonium tetrakis(pentafluorophenyl)borate.

Examples of the usable aromatic ammonium salt include 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis(pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate and 1-(naphthylmethyl)-2-cyanopyridinium tetrakis(pentafluorophenyl)borate.

Examples of the usable thianthrenium salt include 5-methylthianthrenium hexafluorophosphate, 5-methyl-10-oxothianthrenium tetrafluoroborate and 5-methyl-10,10-dioxothianthrenium hexafluorophosphate.

Examples of the usable thioxanthonium salt include S-biphenyl-2-isopropylthioxanthonium hexafluorophosphate.

Examples of the usable ($\eta^6$-isopropylbenzene)($\eta^5$-cyclopentadienyl)-Fe salt include ($\eta^6$-sopropylbenzene)($\eta^5$-cyclopentadienyl)-Fe(II) hexafluorophosphate, ($\eta^6$-isopropylbenzene)($\eta^5$-cyclopentadienyl)-Fe(II) hexafluoroantimonate, ($\eta^6$-isopropylbenzene)($\eta^5$-cyclopentadienyl)-Fe(II) tetrafluoroborate and ($\eta^6$-isopropylbenzene)($\eta^5$-cyclopentadienyl)-Fe(II) tetrakis(pentafluorophenyl)borate.

Examples of the commercially-available photocationic polymerization initiator include CPI®-100P, CPI®-110P, CPI®-101A, CPI®-200K and CPI®-210S (each product of San-Apro), Cyracure® photocure initiator UVI-6990, Cyracure® photocure initiator UVI-6992 and Cyracure® photocure initiator UVI-6976 (each, product of Dow Chemical Japan), Adeka Optomer SP-150, Adeka Optomer SP-152, Adeka Optomer SP-170, Adeka Optomer SP-172 and Adeka Optomer SP-300 (each, product of ADEKA), CI-5102 and CI-2855 (each, product of Nippon Soda), SAN-AID® SI-60L, SAN-AID® SI-80L, SAN-AID® SI-100L, SAN-AID® SI-110L, SAN-AID® SI-180L, SAN-AID® SI-110 and SAN-AID® SI-180 (each, product of Sanshin Chemical Industry), Esacure® 1064 and Esacure® 1187 (each, product of Lamberti), Omnicat 550 (product of IGM Resins), Irgacure® 250 (product of BASF) and (RHODORSILPHOTOINITIATOR 2074 (product of Rhodia Japan).

In the invention, two or more of the above-described photocationic polymerization initiators may be used in combination or they may be used singly. In order to make a polymerization reaction proceed by heat treatment after shaping, another curing agent such as thermal cationic polymerization initiator may be added at the same time.

The addition amount of the photoacid generator is preferably 0.1 part by mass or more to 15 parts by mass or less, more preferably 0.1 part by mass or more to 10 parts by mass or less, each based on 100 parts by mass of the total amount of the cationic polymerizable compounds. Amounts of the photoacid generator smaller than the above-described range may tend to lead to insufficient polymerization. Amounts of the photoacid generator larger than the above-described range may lead to uneven polymerization due to deterioration in light transmission properties.

(Thermal Acid Generator)

A thermal acid generator is also called "thermal cationic polymerization initiator". It exhibits a substantial function as a curing agent that makes heat curing proceed by a thermal decomposition reaction caused by a cationic species-containing compound excited by heating. Different from an acid anhydride, an amine, a phenolic resin or the like ordinarily used as a curing agent, the thermal cationic polymerization initiator causes neither a time-dependent viscosity increase nor gelation at the normal temperature of the resin composition, even if it is contained in the resin composition. This makes it possible to provide a one-pack type resin composition excellent in handling properties.

Examples of the thermal cationic polymerization initiator include diphenyliodonium hexafluoroarsenate, diphenyliodonium hexafluorophosphate, diphenyliodonium trifluoromethanesulfonate, triphenylsulfonium tetrafluoroborate, tri-p-tolylsulfonium hexafluorophosphate, tri-p-tolylsulfonium trifluoromethanesulfonate, bis(cyclohexylsulfonyl)diazomethane, bis(tert-butylsulfonyl)diazomethane, bis(p-toluenesulfonyl)diazomethane, triphenylsulfonium trifluoromethanesulfonate, diphenyl-4-methylphenylsulfonium trifluoromethanesulfonate, diphenyl-2,4,6-trimethylphenylsulfonium p-toluenesulfonate, diphenyl-p-phenylthiophenylsulfonium hexafluorophosphate.

The thermal cationic polymerization initiators usable in the invention are commercially available products, for example, diazonium salt-based compounds such as AMERICURE series (product of American Can), ULTRASET series (product of Adeka) and WPAG series (product of Wako Pure Chemical), iodonium salt-based compounds such as UVE series (product of General Electric), FC series (product of 3M), UV9310C (product of GE Toshiba Silicones) and WPI series (product of Wako Pure Chemical), sulfonium salt-based compounds such as CYRACURE series (product of Union Carbide), UVI series (product of General Electric), FC series (product of 3M), CD series (product of Sartomer), Optomer SP series and Optomer CP series (product of Adeka), SAN-AID SI series (product of Sanshin Chemical Industry), CI series (product of Nippon Soda), WPAG series (Wako Pure Chemical) and CPI series (product of San-Apro).

In the invention, two or more of the above-described thermal cationic polymerization initiators may be used in combination or they may be used singly. A thermal cationic polymerization initiator that decomposes at high temperatures may be used in order to make the polymerization reaction proceed by the heat treatment after shaping.

The addition amount of the thermal acid generator is preferably 0.1 part by mass or more to 15 parts by mass or less, more preferably 0.1 part by mass or more to 10 parts by mass or less, each based on 100 parts by mass of the total amount of the cationic polymerizable compounds. Amounts of the thermal acid generator smaller than the above range tend to lead to insufficient polymerization.

[Anionic Polymerization Initiator]

As an anionic polymerizable compound to be added, as a reactive diluent (D) which will be described later, to the curable resin composition of the invention, an anionic polymerization initiator can be used. As the anionic polymerization initiator, a photobase generator may be added.

(Photobase Generator)

The term "photobase generator" means a compound generating a base when exposed to energy rays such as ultraviolet rays or visible rays. In particular, a salt containing a borate anion is referred because it is excellent in sensitivity to light. Specific examples of the commercially available photobase generator include, but not limited to, U-CAT5002, product of San-Apro and P3B, BP3B, N3B and MN3B, product of Showa Denko.

The addition amount of the anionic polymerization initiator is preferably 0.1 part by mass or more to 15 parts by mass or less, more preferably 0.1 part by mass or more to 10 parts by mass or less, each based on 100 parts by mass of the total amount of the anionic polymerizable compounds. Amounts of the anionic polymerization initiator smaller than the above-described range may tend to lead to insufficient polymerization.

[Another Curing Agent]

The curable resin composition of the invention can contain the following thermal latent curing agent. The term "thermal latent curing agent" means a curing agent that makes heat curing proceed by heating.

As acid anhydrides (acid anhydride-based curing agents), known or conventional acid anhydride-based curing agents can be used. Examples include, but not particularly limited to, methyltetrahydrophthalic anhydrides (4-methyltetrahydrophthalic anhydride, 3-methyltetrahydrophthalic anhydride and the like), methylhexahydrophthalic anhydrides (4-methylhexahydrophthalic anhydride, 3-methylhexahydrophthalic anhydride and the like), dodecenylsuccinic anhydride, methyl-endo-methylene tetrahydrophthalic anhydride, phthalic anhydride, maleic anhydride, tetrahydrophthalic anhydride, hexahydrophthalic anhydride, methylcyclohexene dicarboxylic anhydride, pyromellitic anhydride, trimellitic anhydride, benzophenone tetracarboxylic anhydride, nadic anhydride, methylnadic anhydride, hydrogenated methylnadic anhydride, 4-(4-methyl-3-pentenyl) tetrahydrophthalic anhydride, succinic anhydride, adipic anhydride, sebacic anhydride, dodecanedioic anhydride, methylcyclohexene tetracarboxylic anhydride, vinyl ether-maleic anhydride copolymer and alkylstyrene-maleic anhydride copolymer. Of these, acid anhydrides in liquid form at 25° C. [for example, methyltetrahydrophthalic anhydride, methylhexahydrophthalic anhydride, dodecenylsuccinic anhydride and methyl-endo-methylene tetrahydrophthalic anhydride] are preferred from the standpoint of handling ease. Acid anhydrides in solid form at 25° C., on the other hand, tend to improve the handling ease of the curable resin composition of the invention when used as a liquid mixture obtained by dissolving them in an acid anhydride in liquid form at 25° C. As the acid anhydride-based curing agent, anhydrides of a saturated monocyclic hydrocarbon dicarboxylic acid (also including the anhydrides having a ring to which a substituent such as alkyl is bonded) are preferred from the standpoint of heat resistance and transparency of the cured product.

As amines (amine-based curing agents), known or conventional amine-based curing agents can be used. Examples include, but not particularly limited to, aliphatic polyamines such as ethylenediamine, diethylenetriamine, triethylenetetramine, tetraethylenepentamine, dipropylenediamine, diethylaminopropylamine and polypropylenetriamine, alicyclic polyamines such as menthanediamine, isophoronediamine, bis(4-amino-3-methyldicyclohexyl)methane, diaminodicyclohexylmethane, bis(aminomethyl)cyclohexane, N-aminoethylpiperazine and 3,9-bis(3-aminopropyl)-3,4,8,10-tetraoxaspiro[5,5]undecane, mononuclear polyamines such as m-phenylenediamine, p-phenylenediamine, tolylene-2,4-diamine, tolylene-2,6-diamine, mesitylene-2,4-diamine, 3,5-diethyltolylene-2,4-diamine, and 3,5-diethyltolylene-2,6-diamine and aromatic polyamines such as biphenylenediamine, 4,4-diaminodiphenylmethane, 2,5-naphthylenediamine and 2,6-naphthylenediamine.

As phenols (phenol-based curing agents), known or conventional phenolic curing agents can be used. Examples include, but not particularly limited to, aralkyl resins such as novolac phenolic resins, novolac cresol resins, paraxylylene-modified phenolic resins and paraxylylene/metaxylylene modified phenolic resins, terpene-modified phenolic resins, dicyclopentadiene-modified phenolic resins and triphenolpropane.

Examples of polyamide resins include polyamide resins having, in the molecule thereof, either one or both of a primary amino group and a secondary amino group.

As imidazoles (imidazole-based curing agents), known or conventional imidazole-based curing agents can be used. Examples include, but not particularly limited to, 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine and 2,4-diamino-6-[2-ethyl-4-methylimidazolyl-(1)]-ethyl-s-triazine.

Examples of polymercaptans (polymercaptan-based curing agents), include liquid polymercaptans and polysulfide resins.

Examples of polycarboxylic acids include adipic acid, sebacic acid, terephthalic acid, trimellitic acid and carboxy-containing polyesters.

The addition amount of the another curing agent is preferably 0.1 part by mass or more to 75 parts by mass or less, more preferably 5 parts by mass or more to 30 parts by mass or less, each based on 100 parts by mass of the total amount of the (meth)acrylic compound (A) and the (meth) acrylic organosiloxane compound (B). Amounts of the another curing agent smaller than the above-described range may tend to lead to insufficient polymerization. Amounts larger than the above-described range may tend to cause deterioration in toughness because a crosslinking reaction proceeds.

<Reactive Diluent (D) (Component D)>

The curable resin composition of the invention may contain a reactive diluent (D) in addition to the (meth)acrylic (A) and the (meth)acrylic organosiloxane compound (B). The curable composition containing the reactive diluent (D) can have a reduced viscosity. Further, a cured product obtained by curing such a curable composition can have controlled mechanical properties or thermal properties. As the reactive diluent (D), a radical polymerizable, cationic polymerizable or anionic polymerizable monomer can be added.

Examples of the radical polymerizable monomer include (meth)acrylate-based monomers, styrene-based monomers, acrylonitrile compounds, vinyl-ester-based monomers, N-vinylpyrrolidone, acrylamide-based monomers, conjugated diene-based monomers, vinyl ketone-based monomers and vinyl halide/vinylidene halide-based monomers. Examples of the cationic polymerizable monomer include epoxy-based monomers, oxetane-based monomers and vinyl ether-based monomers. Examples of the anionic polymerizable monomer include (meth)acrylate-based monomers. Examples are however not limited to them. Of these, the (meth)acrylate-based monomers are particularly preferred from the standpoint of a reaction rate and solubility because they have a reactive group similar to that of the (meth) acrylic compound (A) or (meth)acrylic organosiloxane compound (B).

Examples of the (meth)acrylate-based monomers include monofunctional (meth)acrylate-based monomers such as methyl (meth)acrylate, ethyl (meth)acrylate, n-butyl (meth) acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 2-hydroxyethyl (meth)acrylate, 2-hydroxypropyl (meth)acrylate, 2-hydroxybutyl (meth) acrylate, 4-hydroxybutyl (meth)acrylate, glycidyl (meth) acrylate, tetrahydrofurfuryl (meth)acrylate, phenyl glycidyl (meth)acrylate, dimethylaminomethyl (meth)acrylate, phenyl cellosolve (meth)acrylate, dicyclopentenyl (meth)acrylate, dicyclopentenyloxyethyl (meth)acrylate, biphenyl (meth)acrylate, 2-hydroxyethyl(meth)acryloyl phosphate, phenyl (meth)acrylate, phenoxyethyl (meth)acrylate, phenoxypropyl (meth)acrylate and benzyl (meth)acrylate; and polyfunctional (meth)acrylates such as ethylene glycol di(meth)acrylate, diethylene glycol di(meth)acrylate, triethylene glycol di(meth)acrylate, tetraethylene glycol di(meth) acrylate, nonaethylene glycol di(meth)acrylate, 1,3-butylene glycol di(meth)acrylate, 1,4-butanediol di(meth)acrylate, dimethylol tricyclodecane di(meth)acrylate, trimethylolpropane tri(meth)acrylate, neopentyl glycol di(meth)acrylate, 1,6-hexamethylene di(meth)acrylate, neopentyl glycol hydroxypivalate di(meth)acrylate, pentaerythritol tri(meth) acrylate, pentaerythritol tetra(meth)acrylate, ditrimethylolpropane tetraacrylate, dipentaerythritol tetra(meth)acrylate, dipentaerythritol penta(meth)acrylate, dipentaerythritol hexa(meth)acrylate and tris(meth)acryloxy ethyl isocyanurate.

One or more of the reactive diluents (D) may be used after mixed as needed. The content of the reactive diluent (D) is preferably 10 parts by mass or more to 75 parts by mass or less, more preferably 22 parts by mass or more to 46 parts by mass or less, each based on 100 parts by mass of the total amount of the (meth)acrylic compound (A) and the (meth) acrylic organosiloxane compound (B). Amounts of the reactive diluent (D) more than 75 parts by mass may presumably impair the advantage of the invention. Amounts of the reactive diluent (D) less than 10 parts by mass may presumably lead to a failure in controlling the mechanical properties or thermal properties to fall within a desired range.

<Another Component>

The curable resin composition of the invention may contain, as another optional component, various additives without impairing the object and advantage of the invention. Examples of such additives include resins such as epoxy resin, polyurethane, polybutadiene, polychloroprene, polyester, styrene-butadiene block copolymer, polysiloxane, petroleum resin, xylene resin, ketone resin and cellulose resin; engineering plastics such as polycarbonate, modified polyphenylene ether, polyamide, polyacetal, polyethylene terephthalate, polybutylene terephthalate, ultra-high molecular weight polyethylene, polyphenylsulfone, polysulfone, polyarylate, polyetherimide, polyether ether ketone, polyphenylene sulfide, polyethersulfone, polyamide-imide, liquid crystal polymer, polytetrafluoroethylene, polychlorotrifluoroethylene and polyvinylidene fluoride; fluorine-based oligomers, silicone-based oligomers, polysulfide-based oligomers, reactive monomers such as fluorine-containing monomer and siloxane-structure-containing monomer, soft metals such as gold, silver and lead, substances having a lamellar crystal structure such as graphite, molybdenum disulfide, tungsten disulfide, boron nitride, graphite fluoride, calcium fluoride, barium fluoride, lithium fluoride, silicon nitride and molybdenum selenide; polymerization inhibitors such as phenothiazine and 2,6-di-t-butyl-4-methylphenol, photosensitizers such as benzoin compound, acetophenone compound, anthraquinone compound, thioxanthone compound, ketal compound, benzophenone compound, tertiary amine compound and xanthone compound, polymerization initiating aids, leveling agents, wettability improvers, surfactants, plasticizers, ultraviolet absorbers, silane coupling agents, inorganic fillers, pigments, dyestuffs, anti-oxidants, flame retardants, thickening agents and anti-foaming agents.

<Curable Resin Composition>

The curable resin composition of the invention can be prepared by charging a stirring vessel with adequate amounts of essential components (A), (B) and (C) and, if necessary, another optional component and stirring them typically at 30° C. or more to 120° C. or less, preferably 50° C. or more to 100° C. or less. The stirring time is typically 1 minute or more to 6 hours or less, preferably 10 minutes or more to 2 hours or less. The total content of the components (A) and (B) (the content of the components (A), (B) and (D) when it contains, in addition, the component (D)) is preferably 1 part by mass or more to 100 parts by mass or less, more preferably 25 parts by mass or more to 100 parts by mass or less, further more preferably 75 parts by mass or more to 100 parts by mass or less, each based on 100 parts by mass of the curable resin composition except the component (C). The contents within the above-described range can produce the advantage of the invention fully.

The curable resin composition of the invention has a viscosity at 25° C. of preferably 50 mPa·s or more to 10,000 mPa·s or less, more preferably 70 mPa·s or more to 5,000 mPa·s or less.

The curable resin composition of the invention thus available is used suitably as a photocurable resin composition in an optical three-dimensional shaping method. A three-dimensionally shaped product having a desired shape can be manufactured by an optical three-dimensional shaping method which exposes the curable resin composition of the invention selectively to active energy rays such as ultraviolet ray, electron ray, X-ray or radioactive ray to supply it with energy necessary for curing.

<Cured Product>

The curable resin composition of the invention has, as essential components thereof, the (meth)acrylic compound (A), the (meth)acrylic organosiloxane compound (B) and the curing agent (C) and a cured product can be obtained by curing them. The curing can be performed using any known method such as active energy ray curing or thermal curing, depending on the curing agent contained in the composition. Two or more curing methods may be used in combination.

<Function of Curable Resin Composition>

The curable resin composition of the invention can be formed into a cured product by applying external energy to the composition and thereby curing it. Radicals generated by the curing agent (C) start the radical polymerization reaction of the (meth)acrylic compound (A) and the (meth)acrylic organosiloxane compound (B) and curing of the curable resin composition proceeds. Although the crosslink density in the cured product is preferably higher in order to provide a cured product having enhanced curability and heat resistance, an excessive increase in the crosslink density causes marked deterioration in toughness and the cured product becomes fragile because the crosslink point in the cured product is physically fixed.

The respective number-average molecular weights of the (meth)acrylic compound (A) and the (meth)acrylic organosiloxane compound (B) in the curable resin composition of the invention are specified. This makes it possible to adjust the (meth)acryloyl concentration, that is, crosslink density of the whole curable resin composition to a concentration suited for a cured product for three-dimensional shaping. As a result, a cured product having a balance between toughness and heat resistance superior to that of a conventional product can be obtained.

Further, since the respective number-average molecular weights of the (meth)acrylic compound (A) and the (meth)acrylic organosiloxane compound (B) in the curable resin composition of the invention are specified, the curable resin composition can have a viscosity suppressed to a low level. When a pull up system three-dimensional shaping machine is used, due to improvement in the smoothness stability of the liquid level of the resulting curable resin composition, a cured product can be shaped with improved shaping accuracy compared with that obtained using a conventional composition. In addition, when a pull up system three-dimensional shaping machine is used, a cured product can be shaped with improved shaping accuracy compared with that obtained using a conventional composition because the curable resin composition before curing can be prevented from attaching to the cured product obtained by curing.

<Method of Manufacturing Three-Dimensionally Shaped Product>

The curable resin composition of the invention containing, as the curing agent (C), a photopolymerization initiator such as photoradical polymerization initiator can be used suitably in an optical three-dimensional shaping method. A cured product of a curable resin composition may be formed by using either a conventionally known optical three-dimensional shaping method or apparatus. A method including a step of curing respective layers of the curable resin composition based on slice data and thereby shaping them into a shaped product is a typical preferable example of the optical three-dimensional shaping method. Specific examples include a method of selectively exposing a curable resin composition in liquid form to active energy rays based on slice data in order to form a cured layer having a desired pattern; supplying an uncured curable resin composition onto the resulting cured layer and forming, on the cured layer, a new cured layer continuous thereto by exposing it to active energy rays based on slice data similarly; and repeating this stacking operation to obtain an intended three-dimensionally shaped product finally.

Examples of the active energy rays include ultraviolet rays, electron rays, X-rays and radioactive rays. Of these, ultraviolet rays having a wavelength of 300 nm or more to 450 nm or less are used preferably from economic point of view. As a light source of such active energy rays, an ultraviolet laser (for example, Ar laser and He—Cd laser), a mercury lamp, a xenon lamp, a halogen lamp and a fluorescent lamp can be used. Of these, a laser light source is preferably used because it can enhance an energy level and thereby shorten a shaping time and at the same time, has excellent light harvesting properties so that it can achieve high shaping accuracy.

In forming respective cured resin layers each having a predetermined shape pattern by exposing a surface of a curable resin composition to be shaped to active energy rays, the cured resin layers may be formed by dot or line drawing system by making use of active energy rays narrowed to a spot such as laser rays. Alternatively, a shaping system may be used in which a cured resin layer is formed by carrying out planar exposure of the surface to be formed to active energy rays through a planar drawing mask formed by arranging a plurality of micro-optical shutters such as liquid crystal shutters or digital micro-mirror shutters.

A typical example of the optical three-dimensional shaping method will next be described. First, a support stage provided to enable free up-and-down movement in a storage container is dropped (settled) slightly from the liquid surface of a curable resin composition to supply the curable resin composition onto the support stage and form a thin layer (1) of the composition. Then, the resulting thin layer (1) is exposed selectively to light to form a cured resin layer (1) in solid form. Then, a curable resin composition is supplied onto the resulting cured resin layer (1) to form a thin layer (2) and the resulting thin layer (2) is exposed selectively to light to stack, on the cured resin layer (1), a new cured resin layer (2) continuous thereto and integrated therewith. The above-described step is repeated a predetermined times while changing or not changing a pattern to be exposed to light to form a three-dimensionally shaped product having a plurality of cured resin layers (1, 2, . . . n) stacked integrally.

The resulting three-dimensionally shaped product is taken out from the storage container. After removal of an unreacted portion of the curable resin composition remaining on the surface, the product is washed if necessary. Examples of a detergent used for washing include alcohol-based organic solvents typified by alcohols such as isopropyl alcohol and ethyl alcohol; ketone-based organic solvents typified by acetone, ethyl acetate and methylethyl ketone; and aliphatic organic solvents typified by terpenes. After washing with the detergent, the product may be post-cured by exposure to light or heat if necessary. Post curing is effective for curing the unreacted curable resin composition which may remain on the surface or inside of the three-dimensionally shaped product and reducing the stickiness of the surface of the shaped product and in addition, effective for providing a shaped product having improved initial strength.

<Use>

The curable resin composition and cured product thereof according to the invention can be used for any purpose. They can be used for various purposes such as resins for 3D printer using an optical shaping method, sports goods, medical/nursing care articles, industrial machines/apparatuses, precision machines, electric/electronic apparatuses, electric/electronic parts and building articles.

EXAMPLES

The invention will hereinafter be described in detail by Examples. The invention is however not limited to or by these Examples.

Example 1

A curable resin composition was prepared by mixing components according to the following formulation and stirring the resulting mixture for 2 hours by a stirring apparatus while heating it to 75° C.

[(Meth)Acrylic Compound (A)]

Compound A-30: 66 parts by mass of "UX-6101", product of Nippon Kayaku

Compound A-30 has a structure represented by the following formula (6) in which $L_3$ has a repeating structure of an ether and has a number-average molecular weight of 2,700±500.

[(Meth)Acrylic Organosiloxane Compound (B)]

Compound B-20: 34 parts by mass of "X-22-164", product of Shin-Etsu Chemical.

Compound B-20 has a structure represented by the following formula (7) in which $L_4$ corresponds to $L_4$ in the formula (2) and details of it are described above in the formula (2); and m stands for the number of repeating units to satisfy a number-average molecular weight of 380±100.

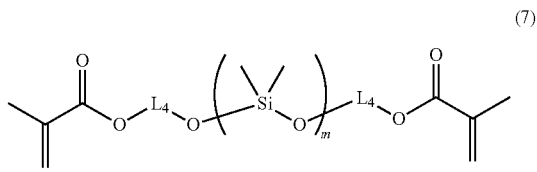

(7)

[Reactive Diluent (D)]

Compound D-1: 36 parts by mass of isobornyl methacrylate

[Curing Agent (C)]

Compound C-1: 3 parts by mass of a photoradical polymerization initiator (1-hydroxycyclohexylphenylketone (Irgacure® 184), product of BASF).

[Preparation of a Test Piece]

A test piece was prepared from the resulting curable resin composition by the process described below. First, the curable resin composition was poured into an 80-mm long, 10-mm wide and 4-mm thick mold sandwiched between 2 quartz glass plates. The curable resin composition thus poured was temporarily cured by exposing it to ultraviolet rays of 5 mW/cm² by using an ultraviolet irradiator ("LIGHT SOURCE EXECURE 3000", trade name; product of HOYA CANDEO OPTRONICS) for 120 seconds from each of both surfaces of the mold. Then, main curing was performed by exposing it to ultraviolet rays for 600 seconds from each of both surfaces and a cured product was obtained (total energy: 7200 mJ/cm²). The cured product thus obtained was heat treated in a heating oven of 50° C. for 1 hour and then in a heating oven of 100° C. for 2 hours to obtain a 80-mm long, 10-mm wide and 4-mm thick test piece.

[Formation of Test Film]

A test film was formed by the following method by using the curable resin composition prepared above. First, several drops of the curable resin composition were placed on the center of a 26-mm wide, 76-mm long and about 1-mm thick slide glass and a 300-μm thick spacer was placed at both ends of the slide glass. A film made of PET was stacked on the dropped curable resin composition and then the slide glass was stacked on the film. The dropped curable resin composition was exposed to ultraviolet rays of 5 mW/cm² for 300 seconds (total energy: 1500 mJ/cm²) by an ultraviolet irradiator ("UV LIGHT SOURCE EX 250", trade name; product of HOYA-SCHOTT). Then, the PET film was removed and the cured product thus obtained was placed in a heating oven, followed by heat treatment in a heating oven

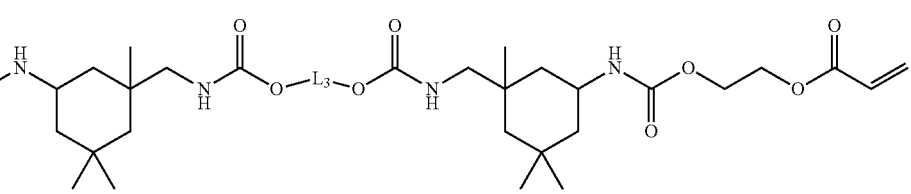

(6)

of 50° C. for 1 hour and then in a heating oven of 100° C. for 2 hours to obtain a test film having a thickness of 300 µm and a diameter of about 2 cm and attached to the slide glass.

[Evaluation]

(Charpy Impact Strength)

According to JIS K 7111, a notch having a depth of 2 mm and an angle of 45° was made at the center portion of the test piece by a notching machine ("Notching Tool A-4", trade name; product of Toyo Seiki Seisaku-sho). The test piece was then broken from the back surface of the notch at energy of 2J by using an impact tester ("IMPACT TESTER IT", trade name; product of Toyo Seiki Seisaku-sho). Energy required for breakage was calculated from an angle of a hammer between a position at a lift up angle of 150° and a position of the hammer after it broke the test piece and lifted up again and was designated as Charpy impact strength serving as an indicator of toughness. Evaluation standards of toughness are shown below. The results thus obtained are shown in Table 1.

A: 7.0 kJ/m² or more, B: less than 7.0 kJ/m² to 5.0 kJ/m² or more,

C: less than 5.0 kJ/m²

(Deflection Temperature Under Load)

According to JIS K 7191-2, the temperature of the test piece was increased at 2° C./min from room temperature at a bending stress of 1.80 MPa by using a tester of deflection temperature under load ("No. 533 HDT test apparatus 3M-2", trade name; product of Toyo Seiki Seisaku-sho). The temperature at which the deflection amount of the test piece reaches 0.34 mm was designated as a deflection temperature under load and used as an indicator of heat resistance. The evaluation standards of the heat resistance are shown below. The results thus obtained are shown in Table 1.

A: 70° C. or more, B: less than 70° C. to 50° C. or more, C: less than 50° C.

(Friction Coefficient)

The dynamic friction coefficient was measured using a friction abrasion tester (HEIDON Type 20, trade name; product of SHINTO Scientific). The test film was fixed onto a rotary stage and was brought into contact with a ball made of SUS 304 and having a diameter of 10 mm so as to give a sliding radius of 5 mm. A vertical load of 100 g was applied to the ball, the stage was rotated at a rate of 10 cm/sec and a force applied between the test film and the ball made of SUS 304 was measured. The friction coefficient was obtained by dividing the force by the load. An average of the friction coefficient measured for 3 hours in total except the initial 5 minutes was designated as a dynamic friction coefficient and was used as an indicator of sliding properties. The standards of sliding properties are shown below. The results thus obtained are shown in Table 1.

A: less than 0.4, B: 0.4 or more to less than 0.5, C: 0.5 or more (Viscosity)

The viscosity of the curable resin composition obtained above was measured as described below by using a viscoelasticity measuring apparatus (MCR302, product of Anton-Paar). The measuring apparatus equipped with a cone-plate type measuring jig (diameter of 25 mm, 2°) was filled with about 0.5 mL of a sample and the temperature was adjusted to 25° C. The value at a shear rate of 50 s⁻¹ was designated as viscosity. Evaluation standards of the viscosity are shown below. The results thus obtained are shown in Table 1.

A: less than 5.0 Pa·s, B: 5.0 Pa·s or more to less than 10 Pa·s, C: 10 Pa·s or more.

Examples 2 to 4, Comparative Examples 1 to 5

In a manner similar to that of Example 1 except that the kind and content of the components were changed as shown in Table 1, curable compositions were prepared and they were evaluated as in Example 1. The results are shown in Table 1. Compounds used in Comparative Examples are as follows:

[(Meth)Acrylic Compound (A)]

Compound A-31: a diacrylate compound obtained by introducing methacrylate in "NL300B", product of Ube Industries and having no urethane structure.

Compound A-32: "UX-5103D" (the number of acryloyl groups in one molecule: 6), product of Nippon Kayaku.

Compound A-33: a urethane dimethacrylate compound having a number average molecular weight of 15,000.

[(Meth)Acrylic Organosiloxane Compound (B)]

Compound A-34: "KUA-PC21", product of KSM (Compound A-34 has a structure similar to that of the formula (6) in which $L_3$ has a carbonate-structure-containing repeating structure; has 2 acryloyl groups in one molecule and has a number average molecular weight of 3,400±500).

Compound A-35: "UX-3204", product of Nippon Kayaku (Compound A-35 has a structure represented by the following formula (8) in which $L_3$ has an ester-structure-containing repeating structure and has a number average molecular weight of 2,600±500).

(8)

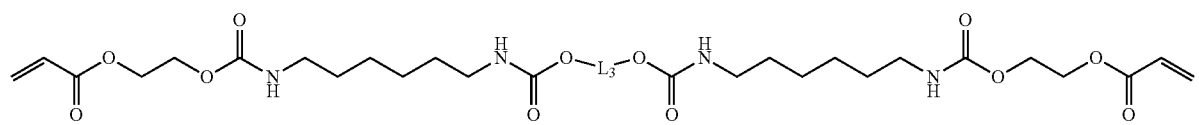

Compound B-21: an unreactive polydimethylsiloxane having no (meth)acryloyl group.

Compound B-22: a (meth)acrylic organosiloxane compound having a number-average molecular weight of 3,600 ("X-22-164B", product of Ube Industries). Compound B-23: "X-22-164AS", product of Shin-Etsu Chemical (Compound B-23 has a structure similar to that of the formula (7), has 2 acryloyl groups in one molecule and has a number-average molecular weight of 900±100).

Compound D-2: isobornyl acrylate

TABLE 1

| | (Meth)acrylic compound (A) | | | (Meth)acrylic organosiloxane (B) | | | Photo-polymerization initiator | | Reactive diluent (D) | | Charpy impact strength | Deflection temperature under load | Friction coefficient | Viscosity |
|---|---|---|---|---|---|---|---|---|---|---|---|---|---|---|
| | Compound | Number-average molecular weight | Parts by mass | Compound | Number-average molecular weight | Parts by mass | Compound | Parts by mass | Compound | Parts by mass | | | | |
| Example 1 | A-30 | 2700 ± 500 | 66 | B-20 | 380 ± 100 | 34 | C-1 | 3 | D-1 | 36 | A | A | B | B |
| Example 2 | A-30 | 2700 ± 500 | 85 | B-20 | 380 ± 100 | 15 | C-1 | 3 | D-1 | 46 | A | B | B | B |
| Example 3 | A-30 | 2700 ± 500 | 40 | B-20 | 380 ± 100 | 60 | C-1 | 2 | D-1 | 22 | B | B | A | A |
| Example 4 | A-30 | 2700 ± 500 | 40 | B-20 | 380 ± 100 | 60 | C-1 | 3 | D-1 | 10 | B | B | B | B |
| Example 5 | A-34 | 3400 ± 500 | 66 | B-20 | 380 ± 100 | 34 | C-1 | 3 | D-1 | 36 | B | B | B | B |
| Example 6 | A-35 | 2600 ± 500 | 66 | B-20 | 380 ± 100 | 34 | C-1 | 3 | D-1 | 46 | A | B | B | B |
| Example 7 | A-30 | 2700 ± 500 | 66 | B-23 | 900 ± 100 | 34 | C-1 | 3 | D-1 | 36 | A | B | B | B |
| Example 8 | A-30 | 2700 ± 500 | 66 | B-20 | 380 ± 100 | 34 | C-1 | 3 | D-2 | 36 | A | B | B | B |
| Comp. Ex. 1 | A-30 | 2700 ± 500 | 18 | B-20 | 380 ± 100 | 82 | C-1 | 2 | D-1 | 10 | C | C | A | A |
| Comp. Ex. 2 | A-30 | 2700 ± 500 | 93 | B-20 | 380 ± 100 | 7 | C-1 | 3 | D-1 | 50 | A | B | C | C |
| Comp. Ex. 3 | A-31 | 3000 | 66 | B-20 | 380 ± 100 | 34 | C-1 | 3 | D-1 | 36 | C | A | B | B |
| Comp. Ex. 4 | A-32 | 3500 | 66 | B-20 | 380 ± 100 | 34 | C-1 | 3 | D-1 | 36 | C | A | B | B |
| Comp. Ex. 5 | A-33 | 15000 | 66 | B-20 | 380 ± 100 | 34 | C-1 | 3 | D-1 | 36 | A | C | B | C |
| Comp. Ex. 6 | A-30 | 2700 ± 500 | 66 | B-21 | 350 | 34 | C-1 | 3 | D-1 | 36 | A | C | B | B |
| Comp. Ex. 7 | A-30 | 2700 ± 500 | 66 | B-22 | 3600 | 34 | C-1 | 3 | D-1 | 36 | A | C | B | C |

As shown in Table 1, the cured products obtained in Examples 1 to 8 according to the invention each had a Charpy impact strength of 5.0 KJ/m² or more, a deflection temperature under load of 50° C. or more and a friction coefficient of less than 0.5, thus satisfying both good toughness and heat resistance and exhibiting high sliding properties. Further, the curable resin compositions has a viscosity of less than 10 Pa·sec, suggesting that the invention can provide a curable resin composition excellent in shaping accuracy.

The (meth)acrylic compound (A):(meth)acrylic organosiloxane compound (B) ratio has a preferable range and the products obtained in Comparative Examples 1 and 2 having them at a ratio outside the preferable range fail to exceed the target values in some of the above-described evaluation items. The results suggest that the (meth)acrylic organosiloxane compound (B) is very effective for reducing the friction coefficient and viscosity, but the products containing it too much inevitably have deteriorated toughness and heat resistance.

The products obtained in Comparative Examples 3 to 5 using, as the component (A), a compound not belonging to the scope of the invention fail to exceed the target value in some of the above-described evaluation items, though the mixing ratio of the component (A) and the component (B) is within the scope of the invention. The results suggest that the (meth)acrylic compound (A) preferably has 2 (meth)acryloyl groups, a urethane or urea structure in the molecule and a number-average molecular weight of 5000 or less.

The products obtained in Comparative Examples 6 and 7 using, as the component (B), a compound not belonging to the scope of the invention fail to exceed the target value in some of the above-described evaluation items, though the mixing ratio of the component (A) and the component (B) is within the scope of the invention. The results suggest that the (meth)acrylic organosiloxane compound (B) has preferably 2 (meth)acryloyl group and a number-average molecular weight of 1000 or less.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-078098, filed Apr. 16, 2018, and Japanese Patent Application No. 2019-044363, filed Mar. 12, 2019, which are hereby incorporated by reference herein in their entirety

What is claimed is:

1. A curable resin composition for three-dimensional shaping, comprising:
   (A) a (meth)acrylic compound having a number-average molecular weight of 5,000 or less and represented by formula (1):

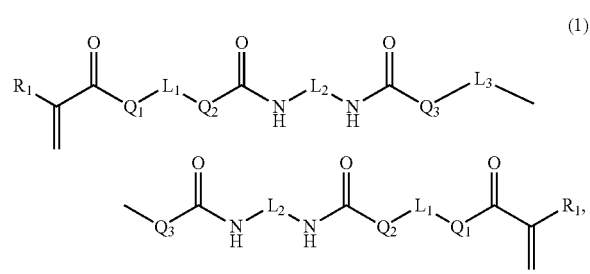

wherein, in the formula (1):
$R_1$ represents a hydrogen atom or a methyl group;
$L_1$ and $L_2$ each represent a substituted or unsubstituted linear or cyclic alkylene group having from 1 to 20 carbon atoms or a substituted or unsubstituted arylene group having from 1 to 20 carbon atoms and the carbon atom(s) constituting the alkylene group or arylene group may be substituted with an oxygen atom, a sulfur atom, a nitrogen atom or a silicon atom;
$L_3$ is a linear or cyclic divalent linking group containing an ether structure, an ester structure or a carbonate structure;
$Q_1$, $Q_2$ and $Q_3$ each represent a divalent linking group —O— or —$NR_2$—, where $R_2$ represents a hydrogen atom or a substituted or unsubstituted linear or cyclic alkyl group having from 1 to 10 carbon atoms;

(B) a (meth)acrylic organosiloxane compound having a number-average molecular weight of 1,000 or less and represented by formula (2):

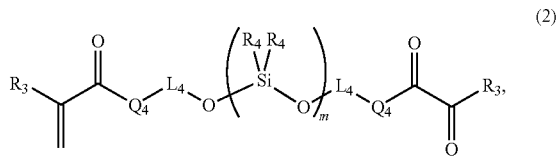

wherein, in the formula (2):
$R_3$ represents a hydrogen atom or a methyl group;
each $R_4$ represents an alkyl group having from 1 to 6 carbon atoms or a phenyl group and respective $R_4$s in different repeating constituting units may be different from each other;
$L_4$ represents a single bond or a substituted or unsubstituted linear or cyclic alkylene group having from 1 to 10 carbon atoms and the carbon atom(s) constituting the alkylene group may be substituted with an oxygen atom, a sulfur atom, a nitrogen atom or a silicon atom;
$Q_4$ represents a single bond or a divalent linking group —O—; and
m represents an average of the number of the repeating constituting units and is a value at which the number-average molecular weight of the (meth)acrylic organosiloxane compound becomes 1,000 or less;
(C) a curing agent; and
(D) a reactive diluent,
wherein:
supposing that a total mass of the (meth)acrylic compound (A) and the (meth)acrylic organosiloxane compound (B) is 100, a (meth)acrylic compound (A) : (meth)acrylic organosiloxane compound (B) mass ratio is from 40:60 to 85:15;
a total content of the (meth)acrylic compound (A) and the (meth)acrylic organosiloxane compound (B) is 75 parts by mass to 100 parts by mass when a mass of the curable resin composition, excluding a mass of the curing agent (C), is 100 parts by mass; and
a content of the reactive diluent (D) is 10 parts by mass to 75 parts by mass based on 100 parts by mass of the total mass of the (meth)acrylic compound (A) and the (meth)acrylic organosiloxane compound (B).

2. The curable resin composition for three-dimensional shaping according to claim 1, wherein the number-average molecular weight of the (meth)acrylic compound (A) is 1000 to 3200.

3. The curable resin composition for three-dimensional shaping according to claim 1, wherein the (meth)acrylic compound (A) has, as $R_1$, a hydrogen atom.

4. The curable resin composition for three-dimensional shaping according to claim 1, wherein the (meth)acrylic compound (A) has, as each of $Q_1$, $Q_2$, and $Q_3$, a divalent linking group —O—.

5. The curable resin composition for three-dimensional shaping according to claim 1, wherein the number-average molecular weight of the (meth)acrylic organosiloxane compound (B) is 200 to 500.

6. The curable resin composition for three-dimensional shaping according to claim 1, wherein the (meth)acrylic organosiloxane compound (B) has, as $R_3$, a methyl group.

7. The curable resin composition for three-dimensional shaping according to claim 1, wherein the (meth)acrylic organosiloxane compound (B) has, as $R_4$, a methyl group.

8. The curable resin composition for three-dimensional shaping according to claim 1, wherein the curing agent (C) is a photopolymerization initiator.

9. The curable resin composition for three-dimensional shaping according to claim 8, wherein the photopolymerization initiator is a photoradical polymerization initiator.

10. The curable resin composition for three-dimensional shaping according to claim 1, wherein the reactive diluent (D) comprises a radical polymerizable monomer.

11. The curable resin composition for three-dimensional shaping according to claim 1, wherein the reactive diluent (D) comprises a (meth)acrylate-based monomer.

12. A method of manufacturing a three-dimensionally shaped product, comprising a step of photocuring a curable resin composition into respective layers thereof based on slice data and shaping them into the shaped product,
wherein the curable resin composition is the curable resin composition as claimed in claim 1.

13. The method according to claim 12, further comprising a step of exposing the shaped product to heat to obtain the three-dimensionally shaped product.

14. The curable resin composition for three-dimensional shaping according to claim 1, wherein a viscosity of the curable resin composition at 25° C. is 70 mPa·s to 5,000 mPa·s.

15. The curable resin composition for three-dimensional shaping according to claim 1, wherein the content of the reactive diluent (D) is 22 parts by mass to 46 parts by mass based on 100 parts by mass based on the total mass of the (meth)acrylic compound (A) and the (meth)acrylic organosiloxane compound (B).

16. A method of manufacturing a three-dimensionally shaped product, comprising a step of photocuring a curable resin composition into respective layers thereof based on slice data and shaping them into the shaped product,
wherein the curable resin composition is the curable resin composition as claimed in claim 10.

17. The curable resin composition for three-dimensional shaping according to claim 1, wherein the reactive diluent (D) comprises isobornyl (meth)acrylate or isobornyl (meth) acrylate.

18. The curable resin composition for three-dimensional shaping according to claim 15, wherein the reactive diluent (D) comprises a radical polymerizable monomer.

19. The curable resin composition for three-dimensional shaping according to claim 15, wherein the reactive diluent (D) comprises a (meth)acrylate-based monomer.

20. The curable resin composition for three-dimensional shaping according to claim 15, wherein the reactive diluent (D) comprises isobornyl methacrylate or isobornyl acrylate.

* * * * *